United States Patent [19]

Soudan

[11] Patent Number: 5,375,743
[45] Date of Patent: Dec. 27, 1994

[54] POLYURETHANE FOAM METERING APPARATUS

[76] Inventor: Freddy D. Soudan, Rabotstraat, 81, BF-9000 Gent, Belgium

[21] Appl. No.: 844,675

[22] PCT Filed: Sep. 6, 1990

[86] PCT No.: PCT/BE90/00050

§ 371 Date: Apr. 8, 1992

§ 102(e) Date: Apr. 8, 1992

[87] PCT Pub. No.: WO91/03362

PCT Pub. Date: Mar. 21, 1991

[30] Foreign Application Priority Data

Sep. 8, 1989 [BE] Belgium ............................ 08900960

[51] Int. Cl.⁵ ............................ B67D 5/00; B29B 7/76
[52] U.S. Cl. ............................ 222/145; 222/146.2; 222/148; 222/504; 239/104; 277/110
[58] Field of Search ............ 222/145, 146.2, 148, 222/504, 135; 239/116, 117, 118, 104; 277/110, 112

[56] References Cited

U.S. PATENT DOCUMENTS

| | | | |
|---|---|---|---|
| 3,263,928 | 8/1966 | Gusmer | 239/123 |
| 3,945,569 | 3/1976 | Sperry | 239/112 |
| 4,469,251 | 9/1984 | Sperry et al. | 222/145 X |
| 4,993,596 | 2/1991 | Brown | 222/145 |

FOREIGN PATENT DOCUMENTS

| | | |
|---|---|---|
| 0068670 | 1/1983 | European Pat. Off. . |
| 0204577 | 1/1987 | European Pat. Off. . |
| 0278849 | 8/1988 | European Pat. Off. . |

*Primary Examiner*—Andres Kashnikow
*Assistant Examiner*—Anthoula Pomrening
*Attorney, Agent, or Firm*—Lockwood Alex Fitzgibbon & Cummings

[57] ABSTRACT

The polyurethane foam metering apparatus comprises a mixing chamber bored out in a core (3) of self-lubricating synthetic material, which core is gripped tightly in a hollow metallic cylinder detachably mounted on a support, in such a manner as to form a demountable cartridge, and compressed at right angles to feed orifices, so as to improve the seal of the valve rod (8) and to prevent infiltration of reactants into the mixing chamber when the latter is closed off by the valve rod (8).

13 Claims, 5 Drawing Sheets

POLYURETHANE FOAM METERING APPARATUS

BACKGROUND OF THE INVENTION

The present invention relates to a metering apparatus for polyurethane foam arising from the reaction of two reactants fed separately via separate feed orifices into a mixing chamber formed from a bore provided axially in a core of self-lubricating synthetic material, which core is mounted in a hollow metallic cylinder and provided over a first length fraction with an angular narrowing around which is fitted a metallic sleeve on which a tightening member acts, in such a manner as to subject a second fraction of core of self-lubricating synthetic material surrounding the feed orifices to a compressive prestress at right angles to these orifices, so as to improve the seal of the joint formed by the bore and a valve rod sliding inside the bore under the action of an actuator in order to actuate the flow of two reactants flowing through the feed orifices into the mixing chamber, and comprising a solvent receptacle disposed in the extension of the mixing chamber and traversed by the valve rod.

The reliability of a polyurethane foam metering apparatus depends mostly on the perfection of the sealing joint between the valve rod and the feed orifices of the mixing chamber. The slightest infiltration of reactants between the Teflon ® core and the valve rod, when the latter is in the closing-off position, causes the valve rod to jam and the feed orifices to be obstructed because of the tendency of the reactants to react with each other instantaneously.

Thus, there is known from document U.S. Pat. No. 4,568,003, a metering gun for polyurethane foam arising from the reaction of polyol and a polyisocyanate separately feeding a mixing chamber.

The mixing chamber is constructed by means of two half-shells made from stainless steel which are capable of withstanding the mechanical stresses exerted during the operation of the metering gun. The first and second half-shells are disposed in colinear alignment in order to form an internal longitudinal cavity. A core made from Teflon is inserted from one side of the cavity and is retained inside the cavity by means of the walls of the second half-shell and by means of a retaining ring.

The mixing chamber has two feed orifices via which two fluid components are fed separately into the said mixing chamber. A valve rod slides inside the bore in order to actuate the flow of the two reactants flowing through the feed orifices towards the central bore of the core and in order to guide the stream of foam spurting out of the mixing chamber.

It enables, in a first position, the reactants to flow through the said first and second orifices and, in a second position, prevents the flow of the reactants through these orifices. The valve rod is actuated forwards or backwards by means of a pneumatic, electric or hydraulic actuator detachably fixed to the valve rod by means of a laterally fitting coupling part.

The core is maintained under a compressive prestress applied along an axial and radial direction via the walls of the second half-shell and via the retaining ring, this prestress being exerted by means of a series of dish-shaped washers, called Belleville washers, maintained in their appropriate position by means of a lip formed at the contact end of the two half-shells. The core is provided with an axial bore longitudinally traversing this bore and in communication with the outside of the mixing chamber and with the reservoir formed on the other side of the cavity defined by the first half-shell. Inside the reservoir is a cleaning fluid or solvent, such as a cellulosic solvent for the polyurethane foam.

By virtue of the compressive prestress exerted on the Teflon ® core, a perfect seal is long-lastingly ensured between the bore and the valve rod. This seal prevents any infiltration of reactants into the mixing chamber but, however, it does not manage to prevent a gradual saturation of the solvent with reactants and with foam.

From document EP-A-0,068,670, there is known an apparatus for dispensing a mixture of liquid reactants fed separately via separate feed orifices into a mixing chamber formed from a bore provided axially in a cylindrical core of self-lubricating synthetic material. The core is provided over a first length fraction with an annular narrowing around which is fitted a metallic sleeve on which a tightening member acts, in such a manner as to subject a second fraction of core of self-lubricating synthetic material surrounding the feed orifices to a compressive prestress at right angles to these orifices so as to improve the seal of the joint between the bore and a valve rod sliding inside the bore under the action of a actuator in order to actuate the flow of two reactants.

The tightening member is a clamp held in place by a pair of screws. Such a clamp ensures the correct orientation of the core of synthetic material in the extension of the hydraulic actuator only when the two screws are fully tightened. It has the drawback that a further tightening of the clamp with a view to adjusting the compressive prestress of the synthetic core is no longer possible.

From document U.S. Pat. No. 3,945,569, there is also known a metering apparatus for polyurethane foam arising from the reaction of two liquid reactants fed separately via separate feed orifices into a mixing chamber bored out in a core of self-lubricating synthetic material, which core is tightly held in a cylindrical metallic cavity by means of a cover non-detachably fixed to the abovementioned cavity by means of plastic deformation. The core has a collar on which the cover acts and bears on a non-demountable cartridge disposed in its extension and compressed at right angles to the feed orifices.

The mixing chamber forms a tamper-proof unit in which the compressive prestress is imposed once and for all during the plastic deformation of the cover.

Further tightening of the cover with a view to adjusting the compressive prestress is not possible.

There is known from document EP-A-0,204,577, a polyurethane foam metering apparatus comprising a mixing chamber and a metering rod which are easily demountable. The mixing chamber is formed from a bore, axially provided in a core of self-lubricating synthetic material, having a tapered shoulder in which two diametrically opposed feed orifices are provided. The core is housed, by tightening, in a cavity of the metering apparatus of corresponding shape.

A valve rod slides inside the bore of the core in order to actuate the flow of two reactants towards the mixing chamber and in order to guide the stream of foam spurting out of the latter.

The core of self-lubricating synthetic material is subjected to a compressive prestress perfectly aligned along its longitudinal axis whatever the degree of tightening, by means of a cap provided with an internal thread screwed over one end of the abovementioned cavity of the metering apparatus provided with a corresponding external thread. The core is maintained at right angles to the feed orifices under a compressive prestress perpendicular to the shoulder. Furthermore, the core comprises a metallic aligning ring enabling the valve rod to be guided and any seizing to be avoided.

However, the free end of the core made from deformable synthetic material emerges into the free air far from the tightening cap and does not manage to prevent the stream from spurting or suddenly deviating.

SUMMARY OF THE INVENTION

The present invention aims to overcome These drawbacks and sets out a metering apparatus comprising a tightening member which ensures the coaxiality of the core of synthetic material whatever the degree of tightening of the tightening member.

It relates to a metering apparatus such as described in the first paragraph of the present document, which metering apparatus is characterized in that the core (3) is provided over a first length fraction with an angular narrowing around which is fitted a metallic sleeve (15) on which the tightening member (13) acts, in such a manner as to subject a second fraction of core of self-lubricating synthetic material surrounding the feed orifices (5, 6) to a compressive prestress at right angles to these orifices.

The cap, detachably fixed by screwing action at the front end of the metallic cylinder, enables the core of self-lubricating synthetic material to be subjected to a compressive prestress perfectly aligned along the longitudinal axis of the metallic cylinder, in such a manner as to ensure a perfect seal of the joint formed by the core of self-lubricating synthetic material and the valve rod.

The compression of the Teflon ® core at right angles to the feed orifices corresponds to a well-defined value when a series of Belleville washers is inserted between the core of self-lubricating synthetic material and the metallic sleeve.

In one particular embodiment, the core of self-lubricating synthetic material is provided, in the vicinity of an intermediate portion of the metallic cylinder, with an aligning ring whose bore is the extension of the bore of the core. The aligning ring and an O-ring type joint at the rear end of the metallic cylinder constitute a double point of bearing and enables the valve rod to be guided along the Teflon ® core without any seizing.

In order to assemble the first embodiment of the metering apparatus, the procedure is as follows:
the valve rod is drawn right back;
the used-up solvent is discharged after the front end of the metering apparatus has been tilted down;
the metering apparatus is rinsed out with a fresh solvent after the front end has been brought back up;
the valve rod is pushed back into the core and
the latter is subjected to a compression obtained by tightening the cap on the metallic cylinder.

BRIEF DESCRIPTION OF THE DRAWINGS

These particular features and details of the invention together with others will become apparent from the detailed description included herein of an embodiment of a metering apparatus according to the invention, with reference to the attached drawings, given by way of non-limiting information, of the invention.

In these drawings.

In these figures, the same reference symbols designate identical and/or similar elements.

DESCRIPTION OF THE PREFERRED EMBODIMENTS

Figure 1:
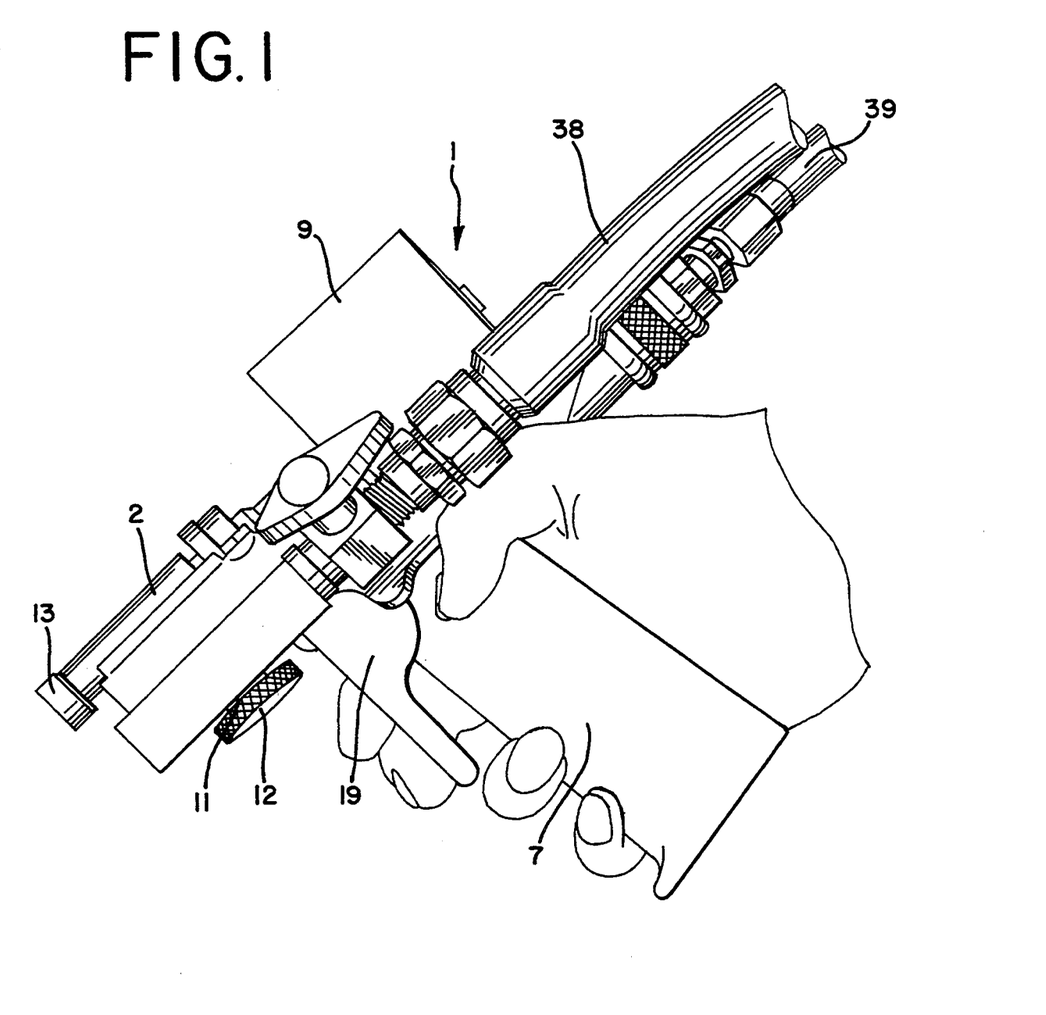
FIG. 1 is a perspective view of a metering apparatus according to the invention.

As illustrated in FIG. 1, a polyurethane foam metering apparatus according to the invention, designated in its entirety by the reference symbol 1, comprises a hollow cylinder 2 housing a core of self-lubricating synthetic material 3 of the Teflon ® type pierced through by an axial bore 4 forming a mixing chamber and by two radial feed orifices 5, 6. The hollow cylinder 2 is detachably mounted on a support or a handgrip 7. The bore 4 is traversed by a valve rod 8 sliding along the bore, under the actuation of a pneumatic or electric actuator 9, between a first position in which reactants can flow through the said first and second radial feed orifices 5, 6 into the mixing chamber and a second position which closes off the said feed orifices and prevents the flow of the reactants towards the mixing chamber.

The pneumatic or electric actuator 9 is fixed to the handgrip 7 with the aid of a pin while the hollow cylinder is detachably mounted on the support in the extension of the actuator by means of a threaded rod 11 and of a knob 12.

The feed orifices 5, 6 are provided with a pair of valves and with appropriate feed pipes 38, 39 enabling the reactants to be fed separately into the mixing chamber. The chemical reactants forming the polyurethane foam are contained in drums, not shown.

Figure 2:
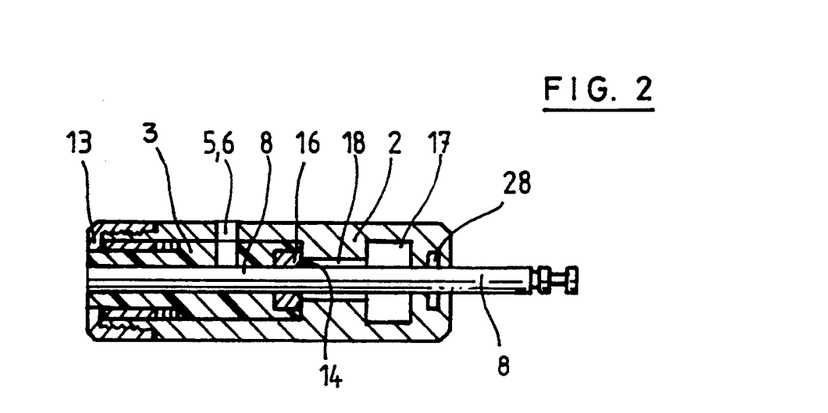
FIGS. 2 and 3 are sectional views of a metallic cylinder detached from the support shown in FIG. 1. They show, respectively, the closed-off and open positions of the mixing chamber with the aid of the valve rod.
Figure 3:
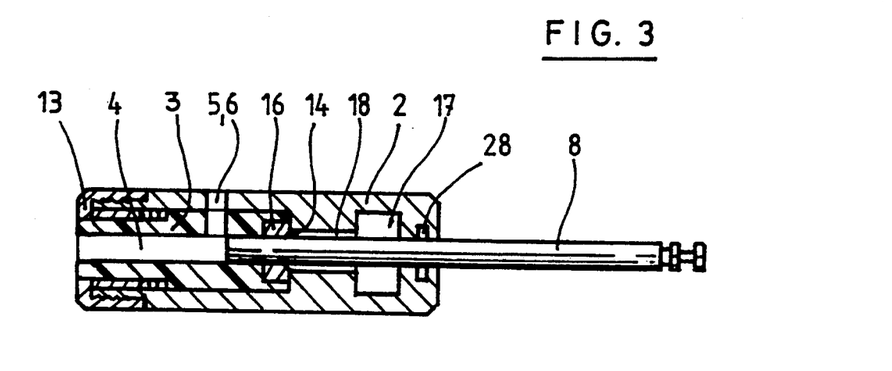

In order to ensure a sealed contact between the valve rod 8 and the Teflon ® core 3, the core is subjected to a compressive prestress at right angles to the feed orifices 5, 6 by tightening a metallic sleeve surrounding an annular narrowing provided in the core 3, over a portion of its length. The tightening is carried out with the aid of a threaded cap 13 screwed onto the front end of the hollow metallic cylinder 2.

By precompressing the fraction of core surrounding the feed orifices 5, 6, the sealing of the valve rod 8 is improved and infiltration of reactants into the mixing chamber is prevented when the latter is closed off by the valve rod 8. The precompression forces are distributed over the Teflon ® core 3 with the aid of a series of Belleville washers 34.

Figure 4:
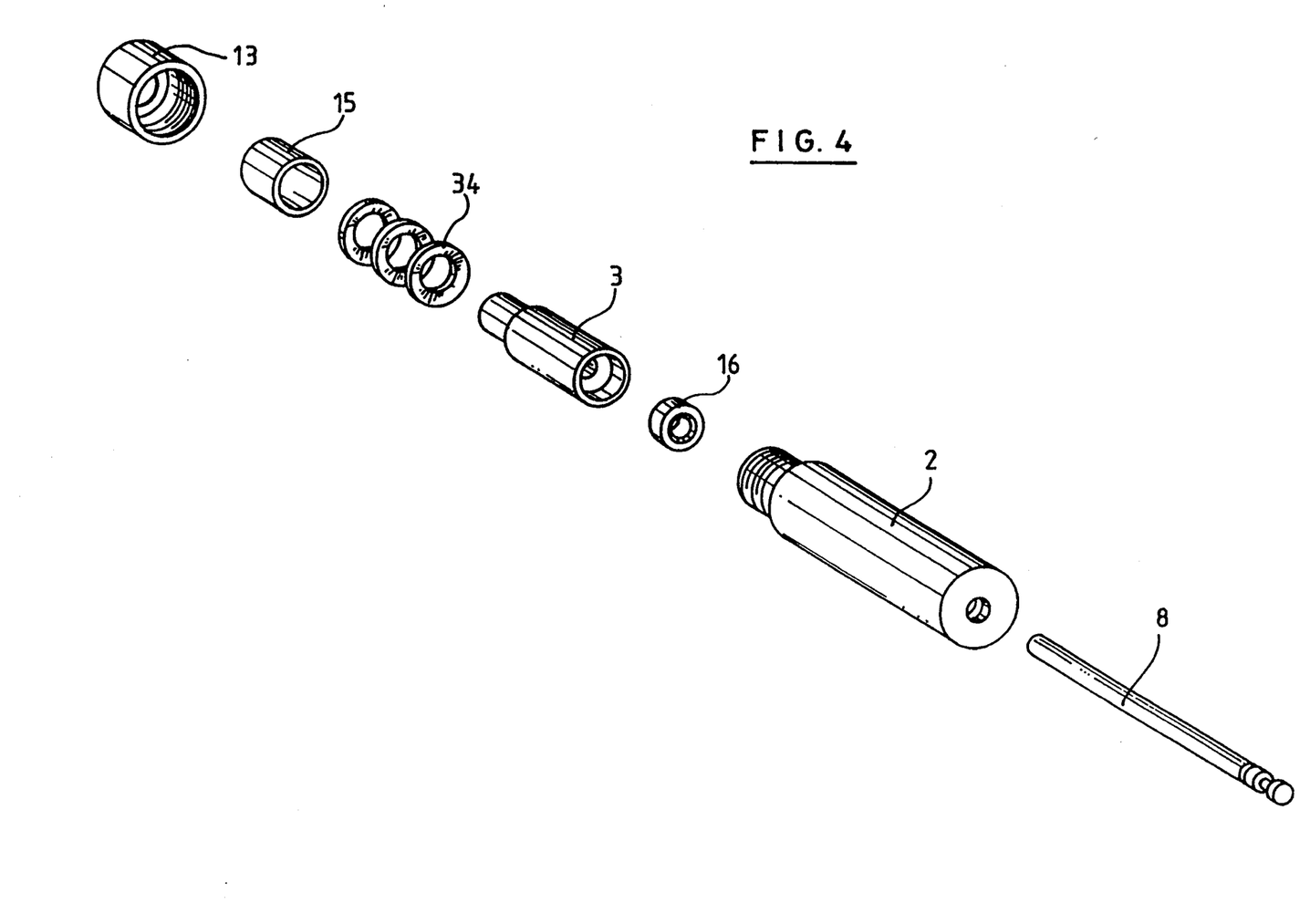
FIG. 4 is an exploded view of the metallic cylinder illustrated in FIG. 2.

The Teflon ® core 3 is provided, in the vicinity of the central portion of the hollow metallic cylinder 2, with an aligning ring 16 made from stainless steel having a circular cross-section of approximately 5 mm in diameter and a thickness of approximately 2 mm, the bore of which is located in the extension of the bore of the core 3 (FIG. 4).

The bore as the aligning ring 16 is machined with a 5/1000 mm tolerance with respect to the diameter of the transverse cross-section of the valve rod 8 and has a conical portion 14 promoting the insertion of the valve rod 8 into the bore 4.

The metallic cylinder 2 is thus provided, at each end and in the middle, with axial holes which guide the axial displacement of the valve rod 8. Thus, the latter does not run the risk of bending or of being jammed under the forces which are applied to it by means of the actuating actuator 9. Thus, premature wear of the core 3 is avoided and the lifetime and reliability of the metering apparatus 1 is extended. The core 3 compressive prestress permits compensation for the wear which the bore 4 would undergo. The valve rod 8 is closed off at right angles to the rear hole of an O-ring sealing joint 17 and of a retention flange 28 machined with a precision of 1/100th mm.

In the withdrawn or open position of the valve rod 8, a position in which the polyurethane foam is dispensed, a portion of the rod which was previously inside the bore 4 in order to close off the nozzle of the feed orifices, is inserted into a receptacle 18 containing solvent. The solvent dissolves the accumulations of polyurethane foam which, in the absence of this cleaning operation, would run the risk of closing off the openings. However, the solvent receptacle 18 becomes gradually enriched in reactants and the solvent has to be renewed from time to time.

According to the invention, the solvent in the receptacle 18 of the first embodiment is renewed by proceeding in the following manner:

the valve rod 8 is drawn back;
the used-up solvent is discharged after the front end of the metering apparatus has been tilted down;
the metering apparatus is rinsed out with a fresh solvent after the front end has been brought back up;
the valve rod 8 is pushed back into the core 3; and
the latter is subjected to a compressive prestress obtained by tightening the cap 13 on the metallic cylinder 2.

It suffices to use a few drops of solvent in order to renew the latter, because of the small volume of the receptacle 18 containing the solvent. Preferably ethylene glycol or MESAMOL ® from BAYER ® is used.

The dismantling of the mixing chamber has the advantage of requiring only the defective parts to be replaced and not all the parts. Thus, many quite expensive parts such as, for example, the hollow metallic cylinder 2, the metallic cap 13 and the valve rod 8 (now, the latter is a precision-machined part made from high-quality steel) may be recovered and reused as they are. Only the worn-out or damaged Teflon ® core 3 has to be replaced.

The dismantling of the mixing chamber also enables any obstruction to be removed from the feed orifices 5, 6 and anything causing the valve rod 8 to jam. It thus enables the solvent to be renewed. This is, therefore, a preventive-maintenance measure intended to avoid excessive pollution of the solvent and therefore untimely blocking of the metering apparatus 1.

Figure 5:
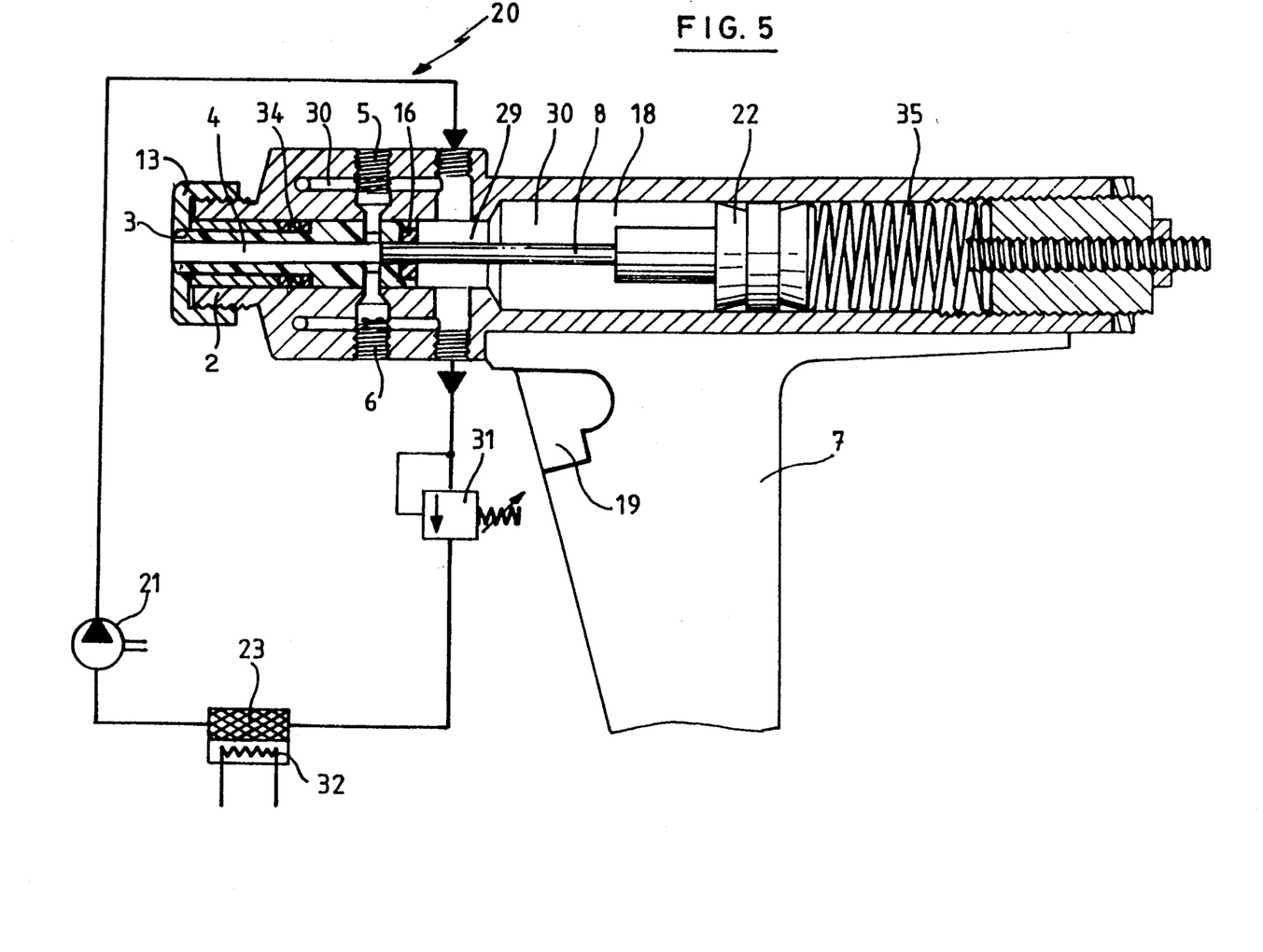
FIGS. 5 and 6 show the closed-off and open positions of the mixing chamber in a second embodiment of the metering gun according to the invention.
Figure 6:
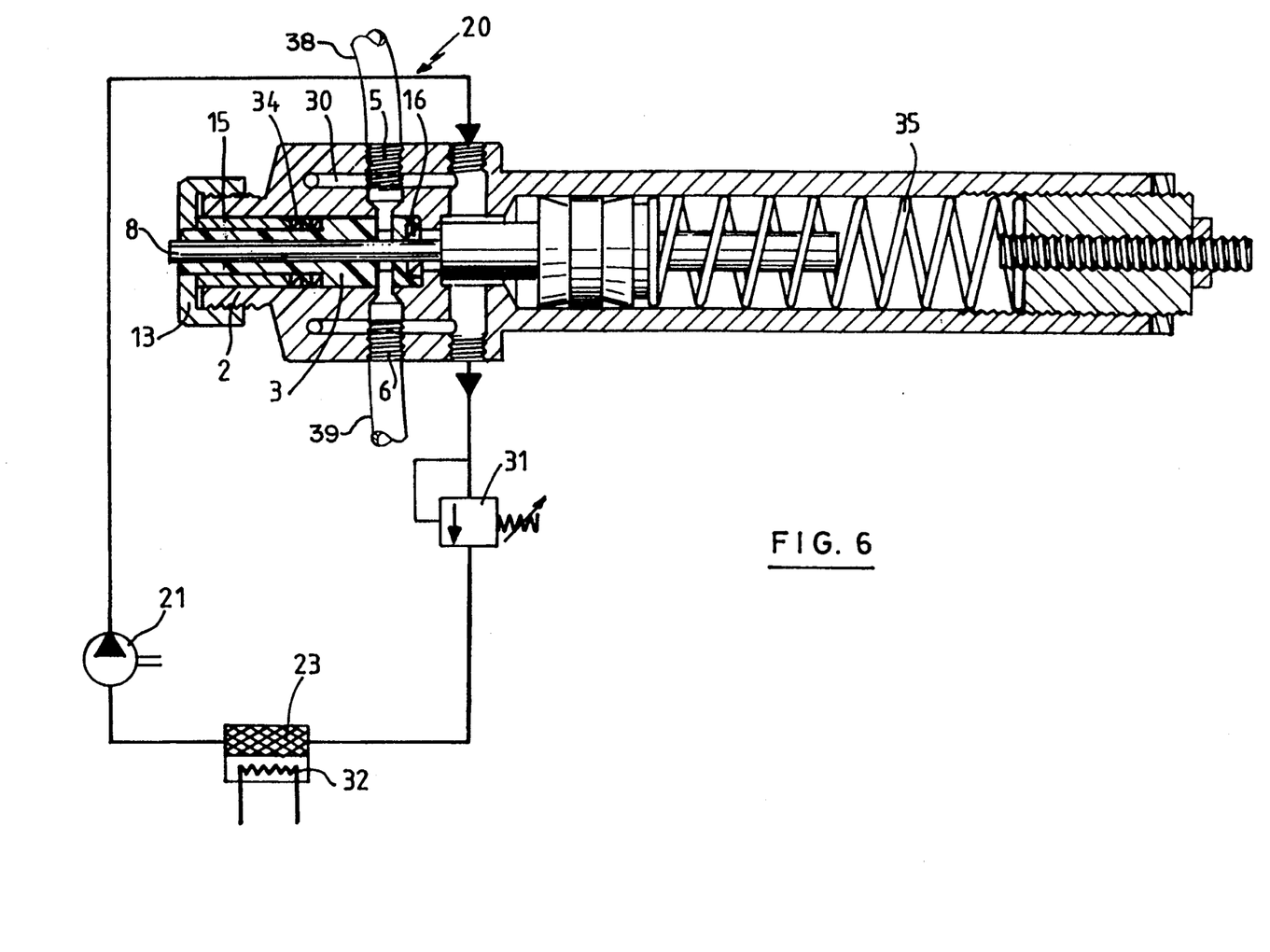

In a second embodiment of the invention, illustrated by FIGS. 5 and 6, the actuating means and the mixing chamber form an insparable compact whole assembled together onto a gun handgrip 7.

The actuating and controlling device consists of an interrupter trigger 19 which actuates the opening or the closing of an electro-hydraulic closing-off valve 31 of a temperature-regulating circuit 20 comprising a hydraulic pump 21, a filter 23 and a means for heating the solvent 32. The hydraulic pump 21, provided on the delivery side with a pressure control valve, directs the solvent, pressurized at 100 bar, into a chamber 29 of a hydraulic actuator 22 which actuates the valve rod 8.

Simultaneously, pressurized air is drawn into each of the drums in order to deliver the reactants into the mixing chamber through the feed pipes 38, 39 and the feed orifices 5, 6.

In order to make it possible for a constant metering of the polyurethane foam components with the aid of a metering apparatus, it has been known to provide the feed pipes 38, 39 of the metering apparatus with a thermostatic heating means intended to keep the temperature of the components constant and, in particular, that of the polyol.

It is known that the viscosity of the polyol varies strongly with temperature and that in the absence of heating, certain difficulties are encountered in suitably metering each of the components after each extended interruption in the operation of the metering apparatus.

In a preferred development of the metering apparatus according to the invention, there is provision for a means of heating, not only each of the feed pipes, but also the head of the metering apparatus.

In fact, existing metering apparatuses have the drawback of discharging, during each cold start, a precursor foam mixture in which the components are not present in the required proportions. In general, a shortage of polyol in relation to isocyanate is observed because of the higher viscosity of the polyol at ambient temperature. This high level of the viscosity slows down the flow of the polyol and is the cause of an insufficient metering of the polyol in relation to the isocyanate whose viscosity is less sensitive to temperature variations.

This results in the precursor foam mixture not expanding either in the required proportions and therefore not supplying the expected volume of polyurethane-foam filling. Now, a variation in the volume of foam discharged by the metering apparatus seriously affects the quality and the accuracy of the operations of an automatic machine.

In order to overcome this drawback, there is provision for freeing at least one orifice for access into the receptacle from the outside with a view to renewing or circulating the solvent.

In a preferred development of the metering apparatus according to the invention, the latter is provided with a temperature-regulating circuit 20 in which a heating fluid is maintain in forced recirculation in a closed loop similar to a hydraulic circuit. The heating fluid is a solvent 30, preferably MESAMOLL ® raised to a temperature of 30° to 70° C. in a heated filter. The solvent 30 is moved with the aid of a constant discharge hydraulic pump 21 provided on the delivery side with a pressure-control valve. The hydraulic circuit also comprises a filter 23, a means 32 for heating the solvent, for example by means of an electrical resistance element, and a two-position actuating valve 31, as illustrated in FIG. 15.

On pressing the trigger 19 of the metering gun, the two-position electro-hydraulic valve 31 closes off the temperature-regulating circuit 20 and causes an increase in the pressure of the solvent 30 downstream from the pump 21. The pressurizes solvent serves as hydraulic fluid in order to actuate the actuator 22 against a spring 35 and draws back the valve rod 8 from the bore 4 by opening the feed orifices 5 and 6, which enables the polyurethane foam components to flow separately towards the mixing chamber.

Excess solvent delivered by the pump is released by a pressure control valve and returned to the pump.

On disengagement of the trigger 19 of the metering gun, the two-position valve frees the thermostatic hydraulic circuit. The spring 35 pushes back the valve rod 8 into the bore 4 and interrupts the metering of foam. The hydraulic pump 21 ensures the forced recirculation of the hot solvent in a closed loop of the thermostatic hydraulic circuit and maintains at constant temperature the pipes feeding each of the components.

Thus, the head of the metering device 1 is always maintained at constant temperature whatever the position of the trigger 19. In the rest position of the trigger, that is to say in the absence of injection, the head is heated by the solvent which circulates in the temperature-regulating circuit. By contrast, in .the operational position, when the circulation of the solvent is interrupted, the head of the metering apparatus is maintained at the same temperature by the passage of the components of the foam.

This hydraulic fluid is forced to flow through a filter 23 into a closed circulation loop comprising two non-return valves.

The pressing, by compressive prestress, of the core 3 of self-lubricating synthetic material is performed with the aid of a metallic sleeve 15 and a cap 13 which is screwed onto a nozzle of the metering gun 1.

The mixing chamber is accessible from the outside by simply unscrewing the cap 13. This unscrewing removes the compressive prestress and it becomes possible to drawback the sleeve 15. After withdrawing the sleeve 15, it thus becomes possible to replace the defective Teflon ® core 3 with a loss of time and of productivity which is reduced to the minimum.

I claim:

1. A metering apparatus for polyurethane foam arising from the reaction of two reactants comprising a mixing chamber formed by a bore axially provided in a core of self-lubricating synthetic material, into which said two reactants are fed separately via separate feed orifices, a hollow metallic cylinder in which said core of self-lubricating synthetic material is mounted, a cap fixed to one end of said hollow metallic cylinder which subjects said core of self-lubricating material to a compressive prestress at right angles to the feed orifices, producing a seal of the joint formed by said bore and a valve rod slidingly engaged inside said bore and a solvent receptacle disposed in said cylinder adjacent said mixing chamber and traversed by said valve rod, the position of said valve rod within said bore being determined by an actuator, said position of said valve rod regulates the flow of the two reactants through said feed orifices into said mixing chamber, said core being provided over a first length fraction with an annular narrowing around which is fitted a metallic sleeve, said cap including internal threads and screwed onto said hollow metallic cylinder, said cylinder being provided with corresponding external threads so that said cap acts upon said metallic sleeve in such a manner as to subject, by tightening the cap, a second fraction of said core of self-lubricating synthetic material surrounding said feed orifices to said compression prestress at right angles to said feed orifices.

2. A metering apparatus for polyurethane foam as defined in claim 1, wherein at least one Belleville washer is disposed between said metallic sleeve and a portion of said core of said synthetic material.

3. A metering apparatus for polyurethane foam as defined in claim 1 wherein said actuator is a hydraulic actuator disposed within said solvent receptacle.

4. A metering apparatus for polyurethane foam as defined in claim 3 wherein said metering apparatus is provided with a thermostatic heating means providing hydraulic fluid which is heated to a predetermined temperature for actuating said hydraulic actuator.

5. A metering apparatus as defined in claim 4 wherein said hydraulic fluid is a solvent.

6. A metering apparatus for polyurethane foam as defined in claim 5 wherein said metering apparatus is provided with a temperature regulating circuit which comprises an hydraulic pump having a constant discharge rate, a filter disposed on the delivery side of said hydraulic pump, said thermostatic means for heating the solvent and an electro-hydraulic valve wherein said temperature regulating circuit is filled with said solvent and wherein said solvent hydraulically regulates the position of the hydraulic actuator connected to said valve rod in said mixing chamber.

7. A metering apparatus for polyurethane foam as defined in claim 1, wherein said cap and said core of self-lubricating synthetic material are removable to provide access to said solvent receptacle.

8. A method for assembling a metering apparatus for polyurethane foam wherein the metering apparatus comprises a mixing chamber formed from a bore axially provided in a core of self-lubricating synthetic material disposed within a hollow metallic cylinder, the mixing chamber including two separate feed orifices for feeding two separate foam reactants into said mixing chambers, a solvent receptacle disposed coaxially adjacent to said mixing chamber and a valve rod slidingly engaging said solvent receptacle and wherein said core of synthetic material is subjected to a compressive prestress at right angles to the feed orifices, said method including the following steps: said valve rod is drawn back; solvent contained in said solvent receptacle is discharged by tilting down a front end of said metering apparatus; said metering apparatus is rinsed out with fresh solvent after the front end of said metering apparatus has been brought back up, said valve rod is slidingly engaged back into said core, and said core of synthetic material is subjected to a compression obtained by tightening a cap which threadedly engages an end of said metallic cylinder thereby producing a compressive prestress upon a metallic sleeve in place upon said core of synthetic material so as to produce a seal between said bore and said valve rod sliding inside said core of said synthetic material.

9. A polyurethane foam metering apparatus comprising:
   a hollow, generally cylindrical metallic housing including a front end having an external threaded portion and an opposed rear end, including an inner core-receiving cavity extending inwardly from the front end to an inner shoulder defined in said housing intermediate said front end and rear end and a solvent receptacle portion extending inwardly from said rear end to said inner shoulder;
   a generally cylindrical core member of self-lubricating material including a front end, a rear end and a central, longitudinally extending axial bore defining a mixing chamber, said core member having a stepped outer configuration including a rearward major diameter portion and a forward minor diameter portion and defining a radial bearing surface therebetween, said core member being telescopically received in said core-receiving cavity so that its rearward major diameter portion abuts said inner shoulder;

a pair of reactant feed orifices extending through said housing and said rearward major diameter portion of said core member and into said mixing chamber;

a valve rod received in said housing and including a front end portion extending into said rear end of said housing, through the solvent receptacle portion through said inner shoulder and slidably received within the central axial bore of said core member, the valve rod being movable between a forward closed position wherein said valve rod extends forwardly into said mixing chamber of said core to block entry of reactants into said mixing chamber through said feed orifices and a retracted open position wherein said valve rod is withdrawn from said core member to a position rearward of said feed orifices to thereby permit reactants to flow through said orifices and into said mixing chamber;

an elongated sleeve member telescopically, and slidably received over said forward minor diameter portion of said core member within said core-receiving cavity;

a cap including an internal threaded portion adapted for threaded engagement with the external threaded portion on the front end of said housing and arranged so that tightening of the cap urges the sleeve member against the radial bearing surface of said core member against said inner shoulder of said housing, thereby providing a localized compressive pre-stress adjacent said feed orifices to provide a lasting effective seal between the core member and said valve rod; and means for reciprocally moving said valve rod between said open and closed positions.

10. A metering apparatus as defined in claim 9, wherein said means for moving the valve rod comprises a hydraulic piston and cylinder actuator connected to a rearward end of said valve rod.

11. A metering apparatus as defined in claim 10, wherein said hydraulic piston and cylinder actuator is defined in said solvent receptacle portion of the housing.

12. A metering apparatus as defined in claim 11, wherein a hydraulic fluid used to move the hydraulic piston in the actuator is a solvent fluid for polyurethane foam and the reactants.

13. A metering apparatus as defined in claim 12, wherein said solvent fluid is maintained at a predetermined elevated temperature to heat the metering apparatus and thereby control polyurethane foam quality.

* * * * *